US012688519B2

(12) United States Patent
Park et al.

(10) Patent No.: US 12,688,519 B2
(45) Date of Patent: Jul. 21, 2026

(54) SHARED VEHICLE AND METHOD OF CONTROLLING THE SAME

(71) Applicants:HYUNDAI MOTOR COMPANY, Seoul (KR); KIA CORPORATION, Seoul (KR)

(72) Inventors: Sung Joon Park, Gwangmyeong-si (KR); Chang Yul Ji, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 167 days.

(21) Appl. No.: 17/554,889

(22) Filed: Dec. 17, 2021

(65) Prior Publication Data
US 2022/0207577 A1 Jun. 30, 2022

(30) Foreign Application Priority Data
Dec. 28, 2020 (KR) ........................ 10-2020-0185007

(51) Int. Cl.
*G06Q 30/0283* (2023.01)
*B60W 50/08* (2020.01)
(Continued)

(52) U.S. Cl.
CPC ....... *G06Q 30/0284* (2013.01); *B60W 50/082* (2013.01); *G06Q 30/0207* (2013.01); *G06Q 50/40* (2024.01); *B60W 2540/229* (2020.02)

(58) Field of Classification Search
CPC .... G06Q 30/0284; G06Q 50/30; G06Q 40/08; B60W 50/082; G05D 1/0061
See application file for complete search history.

(56) References Cited

U.S. PATENT DOCUMENTS 10,664,917 B1* 5/2020 Wasserman ........ G01C 21/3453
10,956,982 B1* 3/2021 Hayward ............... G07C 5/008
(Continued)

FOREIGN PATENT DOCUMENTS

CN 109478292 A 3/2019
CN 109949128 A 6/2019
(Continued)

OTHER PUBLICATIONS

Belt, "Top 7 Things Car Insurance Companies Won't Tell You" Dec. 11, 2019, https://www.alabamainjurylawyer.com/blog/top-7-things-car-insurance-companies-wont-tell-you/ (Year: 2019).*
(Continued)

*Primary Examiner* — Jessica Lemieux
*Assistant Examiner* — Matthew Parker Goodman
(74) *Attorney, Agent, or Firm* — Lempia Summerfield Katz LLC

(57) ABSTRACT

A shared vehicle and a method of controlling the same are aimed to provide a vehicle sharing service capable of efficiently and reasonably calculating a fare for a shared vehicle in various ways. A method of controlling a shared vehicle includes: driving the shared vehicle in at least one driving mode of a manual driving mode in which a driver drives the shared vehicle and an automatic driving mode in which driving is performed without a driver's intervention; calculating a usage fare by a predefined calculation method based on an operation time period of the manual driving mode and an operation time period of the automatic driving mode; and charging a sum of a usage fare of the manual driving mode and a usage fare of the automatic driving mode, as a usage fare for the shared vehicle, on the driver.

22 Claims, 8 Drawing Sheets

(51) Int. Cl.
    *G06Q 30/0207*     (2023.01)
    *G06Q 50/40*     (2024.01)

(56)       References Cited

U.S. PATENT DOCUMENTS

| | | | |
|---|---|---|---|
| 11,485,389 B2 | 11/2022 | Lee et al. | |
| 11,500,974 B2 | 11/2022 | Kim | |
| 2014/0310075 A1* | 10/2014 | Ricci | G06F 3/0622 |
| | | | 705/13 |
| 2017/0106876 A1* | 4/2017 | Gordon | B60W 60/0051 |
| 2017/0372431 A1* | 12/2017 | Perl | G06Q 40/08 |
| 2018/0088577 A1* | 3/2018 | Kim | B60W 30/00 |
| 2019/0064804 A1 | 2/2019 | Frazzoli et al. | |
| 2019/0138952 A1 | 5/2019 | Han et al. | |
| 2019/0179308 A1 | 6/2019 | Hattori | |
| 2019/0180404 A1 | 6/2019 | Park et al. | |
| 2020/0074061 A1 | 3/2020 | Kim | |
| 2020/0311805 A1* | 10/2020 | Sailer | G06Q 20/0855 |
| 2020/0410405 A1* | 12/2020 | ElShenawy | G06Q 50/40 |
| 2021/0042671 A1* | 2/2021 | Torrealba Fuenzalida | |
| | | | G07B 15/06 |
| 2021/0073934 A1* | 3/2021 | Bai | H04W 4/025 |
| 2021/0358025 A1* | 11/2021 | Rosekrans | G07C 5/02 |
| 2022/0024491 A1 | 1/2022 | Lee et al. | |
| 2022/0049967 A1* | 2/2022 | Uyeki | G06Q 10/047 |
| 2022/0309926 A1* | 9/2022 | Yoneda | G06Q 30/0224 |
| 2024/0124031 A1* | 4/2024 | Kim | B60W 30/18163 |

FOREIGN PATENT DOCUMENTS

| | | | | | |
|---|---|---|---|---|---|
| CN | 119090602 A | * | 12/2024 | | |
| DE | 102020204982 A1 | * | 10/2021 | | |
| JP | 6277316 B1 | | 1/2018 | | |
| KR | 2003021337 A | * | 3/2003 | | |
| KR | 2014071190 A | * | 6/2014 | | G06Q 50/30 |
| KR | 101654201 B1 | | 9/2016 | | |
| KR | 20180089202 A | | 8/2018 | | |
| KR | 20180120123 A | | 11/2018 | | |
| KR | 20190052407 A | | 5/2019 | | |
| KR | 20190070550 A | | 6/2019 | | |
| KR | 20190100092 A | | 8/2019 | | |
| KR | 20190118989 A | | 10/2019 | | |
| KR | 10-2063496 B1 | * | 2/2020 | | |
| KR | 20200118352 A | | 10/2020 | | |
| WO | WO-2023113238 A1 | * | 6/2023 | | G06Q 10/02 |

OTHER PUBLICATIONS

US Department of State, "The Point System" Jan. 20, 2017, https://2009-2017.state.gov/ofm/dmv/c66584.htm (Year: 2017).*

Simoni, "Congestion Pricing in a World of Self-driving vehicles: . . . ", Mar. 2018, https://www.researchgate.net/publication/324104396_Congestion_Pricing_in_a_World_of_Self-driving_vehicles_an_Analysis_of_Different_Strategies_in_Alternative_Future_Scenarios (Year: 2018).*

Office Action cited in Chinese application No. 202111570593.1; Jul. 10, 2025; 24 pp.

Office Action cited in corresponding Korean patent application No. 10-2020-0185007; Nov. 14, 2025; 14 pp.

\* cited by examiner

SHARED VEHICLE AND METHOD OF CONTROLLING THE SAME

CROSS-REFERENCE TO RELATED APPLICATION

This application claims the benefit of priority to Korean Patent Application No. 10-2020-0185007, filed on Dec. 28, 2020 in the Korean Intellectual Property Office, the disclosure of which is incorporated herein by reference.

BACKGROUND

1. Field

The present disclosure relates to a vehicle, and more particularly, to a shared vehicle, which is capable of performing autonomous driving and remote driving and which is shared by a plurality of users.

2. Description of the Related Art

A vehicle sharing service is provided in such a way that a plurality of users shares a vehicle and each user pays a fare. In other words, a certain user uses a shared vehicle on his/her desired date (time) and pays a fare corresponding to time (or mileage) for which he/she uses the shared vehicle. The shared vehicle can be used on another date (time) by another user, and the other user also pays a fare corresponding to time (or mileage) for which he/she uses the shared vehicle.

However, upon using a shared vehicle, various conditions and unexpected situations may occur. Therefore, there is a need for efficiently and reasonably calculating a fare by considering all of such various conditions, unexpected situations, etc.

SUMMARY

An aspect of the present disclosure is aimed to provide a vehicle sharing service capable of efficiently and reasonably calculating a usage fare for a shared vehicle in various ways.

Additional aspects of the present disclosure are set forth in part in the following description and, in part, should be apparent from the description or may be learned by practice of the present disclosure.

For the above-described object, a method of controlling a shared vehicle according to the present disclosure includes driving the shared vehicle in at least one driving mode of a manual driving mode in which a driver drives the shared vehicle and an automatic driving mode in which driving is performed without a driver's intervention. The method also includes calculating a usage fare by a predefined calculation method based on an operation time period of the manual driving mode and an operation time period of the automatic driving mode. The method also includes charging a sum of a usage fare of the manual driving mode and a usage fare of the automatic driving mode, as a usage fare for the shared vehicle, on the driver.

In the method of controlling the shared vehicle, the usage fare for the shared vehicle may be calculated by reflecting a discount and an extra charge generated during driving to an expected fare calculated in advance.

In the method of controlling the shared vehicle, when the driver selects the automatic driving mode as a basic driving mode, the discount may be calculated based on at least one of a discount rate A per hour according to a passenger driving time period, the number of fellow passengers, or a discount rate per hour according to a driving route.

In the method of controlling the shared vehicle, when the driver selects the automatic driving mode as a basic driving mode, the extra charge may be calculated based on at least one of an additional rate C per hour according to calculation time by a server or an additional rate D per hour according to an execution time period of a remote driving mode.

The server may be a control subject of controlling the shared vehicle at a remote region to perform remote driving, and the execution time period of the remote driving mode may be a time period for which remote driving of the shared vehicle is performed by a control by the server.

In the method of controlling the shared vehicle, when the driver selects the manual driving mode as a basic driving mode, and an additional passenger drives the shared vehicle in a state in which an initial driver of the shared vehicle is incapable of driving, the discount may be provided to the additional passenger.

In the method of controlling the shared vehicle, when the driver selects the manual driving mode as a basic driving mode, the extra charge may be calculated based on at least one of an additional rate C per hour according to calculation time by a server, an additional rate D per hour according to an execution time period of a remote driving mode, or an additional rate E per hour according to an execution time period of autonomous driving.

In the method of controlling the shared vehicle, when one or more additional passengers except for the driver exist, an additional discount may be generated by the number of the additional passengers.

In the method of controlling the shared vehicle, the usage fare for the shared vehicle may be calculated by further reflecting at least one of the number of passengers of the shared vehicle, a point of departure, a destination, a date, and a time.

In the method of controlling the shared vehicle, the operation time period of the manual driving mode may be determined to be a time period from activation time to end time of the manual driving mode.

In the method of controlling the shared vehicle, the automatic driving mode may include: an autonomous driving mode in which a control subject of the shared vehicle controls the shared vehicle to drive the shared vehicle; and a remote driving mode in which a control subject located at a remote region that is distant from the shared vehicle controls the shared vehicle to drive the shared vehicle.

In the method of controlling the shared vehicle, the driving mode may be converted between the manual driving mode, the autonomous driving mode, and the remote driving mode according to the driver's condition during driving of the shared vehicle.

In the method of controlling the shared vehicle, the driving mode of the shared vehicle may be converted to the autonomous driving mode or the remote driving mode when a predefined careless behavior occurs during the driver's manual driving.

For the above-described object, a shared vehicle according to the present disclosure includes: a device configured to obtain information about a surrounding environment of the shared vehicle; a communicator configured to communicate with a control subject located at a remote region; and a controller configured to perform a control for driving the shared vehicle in at least one driving mode of a manual driving mode in which a driver drives the shared vehicle or an automatic driving mode in which driving is performed without a driver's intervention. The controller may also be configured to calculate a usage fare by a predefined calculation method based on an operation time period of the manual driving mode and an operation time period of the automatic driving mode. The controller may also be configured to charge a sum of a usage fare of the manual driving mode and a usage fare of the automatic driving mode, as a usage fare for the shared vehicle, on the driver.

In the shared vehicle, the usage fare for the shared vehicle may be calculated by reflecting a discount and an extra charge generated during driving to an expected fare calculated in advance.

In the shared vehicle, when the driver selects the automatic driving mode as a basic driving mode, the discount may be calculated based on at least one of a discount rate A per hour according to a passenger driving time period, the number of fellow passengers, or a discount rate per hour according to a driving route.

In the shared vehicle, when the driver selects the automatic driving mode as a basic driving mode, the extra charge may be calculated based on at least one of an additional rate C per hour according to calculation time by a server or an additional rate D per hour according to an execution time period of a remote driving mode The server may be a control subject of controlling the shared vehicle at a remote region to perform remote driving. The execution time period of the remote driving mode may be a time period for which remote driving of the shared vehicle is performed by a control by the server.

In the shared vehicle, when the driver selects the manual driving mode as a basic driving mode, and an additional passenger drives the shared vehicle in a state in which an initial driver of the shared vehicle is incapable of driving, the discount may be provided to the additional passenger.

In the shared vehicle, when the driver selects the manual driving mode as a basic driving mode, the extra charge may be calculated based on at least one of an additional rate C per hour according to calculation time by a server, an additional rate D per hour according to an execution time period of a remote driving mode, or an additional rate E per hour according to an execution time period of autonomous driving.

In the shared vehicle, when one or more additional passengers except for the driver exist, an additional discount is generated by the number of the additional passengers.

In the shared vehicle, the usage fare for the shared vehicle may be calculated by further reflecting at least one of the number of passengers of the shared vehicle, a point of departure, a destination, a date, or a time.

In the shared vehicle, the operation time period of the manual driving mode may be determined to be a time period from activation time to end time of the manual driving mode.

In the shared vehicle, the automatic driving mode may include: an autonomous driving mode in which a control subject of the shared vehicle controls the shared vehicle to drive the shared vehicle; and a remote driving mode in which a control subject located at a remote region that is distant from the shared vehicle controls the shared vehicle to drive the shared vehicle.

In the shared vehicle, the driving mode may be converted between the manual driving mode, the autonomous driving mode, and the remote driving mode according to the driver's condition during driving of the shared vehicle.

In the shared vehicle, the driving mode of the shared vehicle may be converted to the autonomous driving mode or the remote driving mode when a predefined careless behavior occurs during the driver's manual driving.

BRIEF DESCRIPTION OF THE DRAWINGS

These and/or other aspects of the present disclosure should become apparent and more readily appreciated from the following description of the embodiments, taken in conjunction with the accompanying drawings of which.

DETAILED DESCRIPTION

Figure 1:
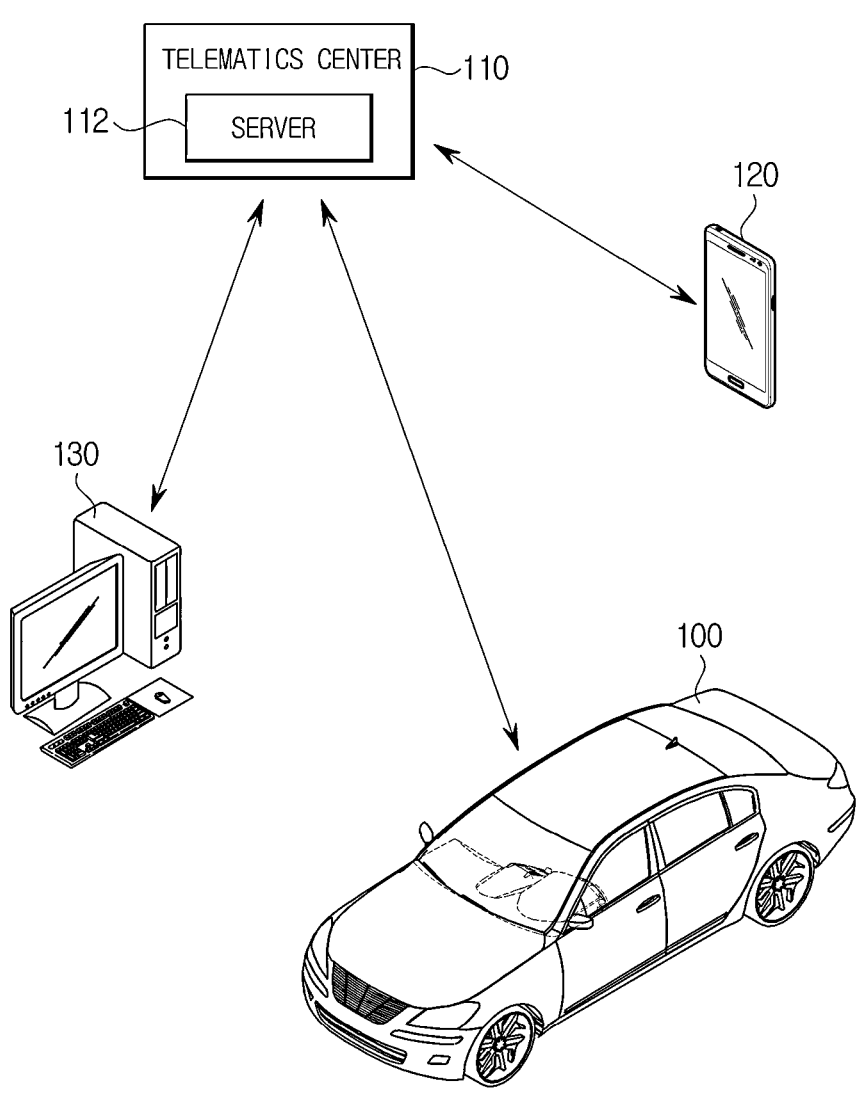
FIG. 1 shows a configuration of a vehicle sharing system according to an embodiment of the present disclosure.

FIG. 1 shows a configuration of a vehicle sharing system according to an embodiment of the present disclosure.

In FIG. 1, a shared vehicle 100 may use a method in which each of a plurality of users obtains authority for use through an application and pays a fare corresponding to use after actually using the shared vehicle 100. The shared vehicle 100 may perform 'direct driving', 'autonomous driving', and 'remote driving'. The 'direct driving' may be for a passenger (driver) to sit in a driver seat and himself/herself drive the shared vehicle 100. The 'autonomous driving' may be for a control subject (for example, a controller 202) of the shared vehicle 100 to recognize, without a passenger's intervention, a surrounding environment and an internal environment (for example, a passenger's condition, etc.). The control subject of the shared vehicle 100 may also drive the shared vehicle 100 to a destination along a route while performing steering, acceleration, deceleration, braking, stopping, driving mode conversion, etc. of the shared vehicle 100 through a control. The 'remote driving' may also be to perform driving without a passenger's intervention. The 'remote driving' may be for another control subject (for example, a server 112 of a telematics center 110, which is described below) located at a remote region to control the shared vehicle 100 from a long distance through communication to move the shared vehicle 100 to a destination along a route while performing steering, acceleration, deceleration, braking, stopping, driving mode conversion, etc. of the shared vehicle 100.

The 'direct driving' may be classified as manual driving in which a driver himself/herself drives a vehicle. A driving mode in which the 'direct driving' is performed is referred to as a manual driving mode. Also, the 'autonomous driving' and 'remote driving' may be classified as automatic driving in which driving is performed without a driver's intervention. A driving mode in which the 'autonomous driving' or 'remote driving' is performed is referred to as an automatic driving mode.

The shared vehicle 100 according to an embodiment of the present disclosure may enable autonomous driving under predefined conditions. The shared vehicle 100 may be an autonomous driving vehicle of level 3 or more in which a driver sitting in a driver seat himself/herself responds to an unexpected situation.

The telematics center 110 may include the server 112. The server 112 of the telematics center 110 may receive a usage application for the shared vehicle 100, assign the shared vehicle 100 to an applicant, calculate a fare for the shared vehicle 100, and perform a remote driving control for the shared vehicle 100.

The server 112 of the telematics center 110 may obtain information about a date and time on which a user wants to use the shared vehicle 100, the number of users (the number of passengers), a point of departure (a point of riding), a destination, a driving mode, etc. in advance by receiving a usage application for the shared vehicle 100.

Also, the server 112 of the telematics center 110 may assign the shared vehicle 100 matching with usage application contents to an applicant who has applied a vehicle sharing service. Assignment of the shared vehicle 100 may include guiding a user (passenger) to move to a location of the shared vehicle 100 and use the shared vehicle 100 or may include moving the shared vehicle 100 to a location of a user (passenger) through an autonomous driving function or a remote driving function to enable the user (passenger) to use the shared vehicle 100. When the server 112 of the telematics center 110 assigns the shared vehicle 100, the server 112 of the telematics center 110 may transmit, to the passenger's mobile device 120, information (a license plate number, etc.) about the shared vehicle 100 and/or the information including an authentication key for enabling the passenger to lock/unlock doors of the shared vehicle 100 by using the mobile device 120.

Also, the server 112 of the telematics center 110 may calculate a fare for the shared vehicle 100. For example, the server 112 of the telematics center 110 may calculate a fare (usage fee), which the user has to pay, based on the user's details of use (for example, a driving mode, a driving distance, the number of passengers, etc.) for the shared vehicle 100 and may provide a result of the calculation to the shared vehicle 100.

Also, the server 112 of the telematics center 110 may perform a remote driving control for the shared vehicle 100. For example, the server 112 of the telematics center 110 may control the shared vehicle 100 from a long distance through communication to perform steering, acceleration, deceleration, braking, etc. and may move the shared vehicle 100 to a destination along a route.

The user may apply for use of the shared vehicle 100 by using his/her mobile device 120 or a desktop computer 130. For example, the user may apply for use of a service of the shared vehicle 100 through an app (application) of the mobile device 120. Alternatively, the user may apply for use of a service of the shared vehicle 100 through an internet home page of a shared vehicle service company by using the desktop computer 130.

Figure 2:
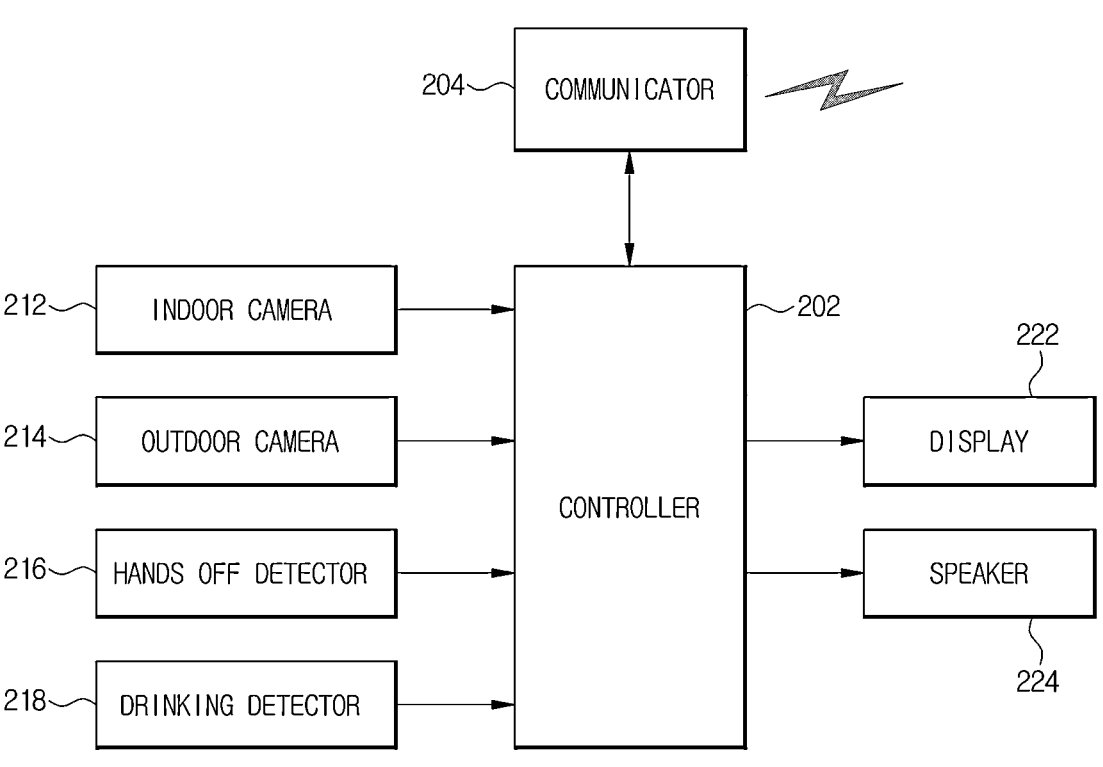
FIG. 2 shows a control system of a shared vehicle according to an embodiment of the present disclosure.

FIG. 2 shows a control system of a shared vehicle according to an embodiment of the present disclosure.

The controller 202 may control overall operations of the shared vehicle 100. For example, in a passenger driving mode, the controller 202 may control the corresponding devices of the shared vehicle 100 in response to a passenger's (driver's) control. Also, for example, in the autonomous driving mode, the controller 202 may recognize a surrounding environment and an internal environment (for example, the passenger's condition, etc.) of the shared vehicle 100. In the autonomous driving mode, the controller 202 may also cause the shared vehicle 100 to move to a destination along a route while performing steering, acceleration, deceleration, braking, stopping, driving mode conversion, etc. Also, for example, in the remote driving mode, the controller 202 may cause the shared vehicle 100 to move to a destination along a route while performing steering, acceleration, deceleration, braking, stopping, driving mode conversion, etc. of the shared vehicle 100 in response to a control signal transmitted from the server 112 of the telematics center 110.

Also, the controller 202 may control conversion between the passenger driving mode, the autonomous driving mode, or the remote driving mode and a temporary stop, emergency parking, etc. of the shared vehicle 100. The conversion is performed based on an internal or external situation of the shared vehicle 100, detected by a device, such as an indoor camera 212, an outdoor camera 214, a hands off detector 216, a drinking detector 218, etc., which are described below.

Also, the controller 202 may calculate a fare and notify the fare by considering various situations generated while the shared vehicle 100 is traveling.

A communicator 204 may cause the controller 202 of the shared vehicle 100 to communicate with the server 112 of the telematics center 110, a user's mobile device 120, etc. The controller 202 may transmit/receive various information and data related to operations of the shared vehicle 100 to/from the server 112 and the mobile device 120 through the communicator 204.

The indoor camera 212 may be installed in a room of the shared vehicle 100 to inform a passenger's condition through an image. For example, the controller 202 may check the number of passengers, determine whether a driver falls asleep at the steering wheel, and perform a passenger's facial recognition, etc. by analyzing an image photographed by the indoor camera 212. Through a passenger's facial recognition performed by using the indoor camera 212, whether the passenger's (particularly, a driver's) physical condition is inappropriate for driving may be determined. For example, when a driver's eyes closed or a driver's head lowered is maintained for a preset time period or more, it may be determined that the driver's condition is inappropriate for driving.

The outdoor camera 214 may be provided to photograph outside (surroundings) of the shared vehicle 100. For example, the outdoor camera 214 may be installed in a front grille of the shared vehicle 100 to photograph a front view (forward direction) of the shared vehicle 100, in side mirrors of the shared vehicle 100 to photograph left and right views of the shared vehicle 100, or in a rear portion of the shared vehicle 100 to photograph a rear view (backward direction) of the shared vehicle 100. The outdoor camera 214 may be a kind of device for obtaining surrounding environment information for autonomous driving of the shared vehicle 100 by photographing surroundings of the shared vehicle 100. Also, the outdoor camera 214 may be used to inform a traffic situation (smooth/delay/jam/congestion) by photographing surroundings of the shared vehicle 100. A device for obtaining surrounding environment information of the shared vehicle 100 may further include RADAR or LiDAR, in addition to the outdoor camera 214.

The hands off detector 214 may be used to check whether the driver sitting in the driver seat grips the steering wheel. The hands off detector 216 may be, for example, a capacitive sensor. In other words, whether or not the driver grips the steering wheel may be detected through a change of capacitance depending on whether the driver's hand contacts the steering wheel. Information about whether the driver grips the steering wheel may be reflected in calculating a fare for the shared vehicle 100.

The driving detector 218 may be a device for determining whether or not the driver sitting in the driver seat is drunk. The driving detector 218 may be an alcohol sensor. For example, the drinking detector 218 may detect alcohol from air from the mouth of the driver sitting in the driver seat. The controller 202 may determine whether the driver is drunk based on a result of the detection by the drinking detector 218.

A display 222 may be a part of a multimedia device or may be a cluster provided on an instrument board. The display 222 may display various visual information that the shared vehicle 100 provides to a driver and other passengers. For example, a fare that a passenger has to pay after using the shared vehicle 100 may be calculated and then notified to a user (the passenger) through the display 222.

A speaker 224 may be connected to the multimedia device to output an audio signal. The speaker 224 may output various auditory information that the shared vehicle 100 provides to a driver and other passengers. For example, a fare that a passenger has to pay after using the shared vehicle 100 may be calculated and then notified to a user (the passenger) through the speaker 224.

Figure 3:
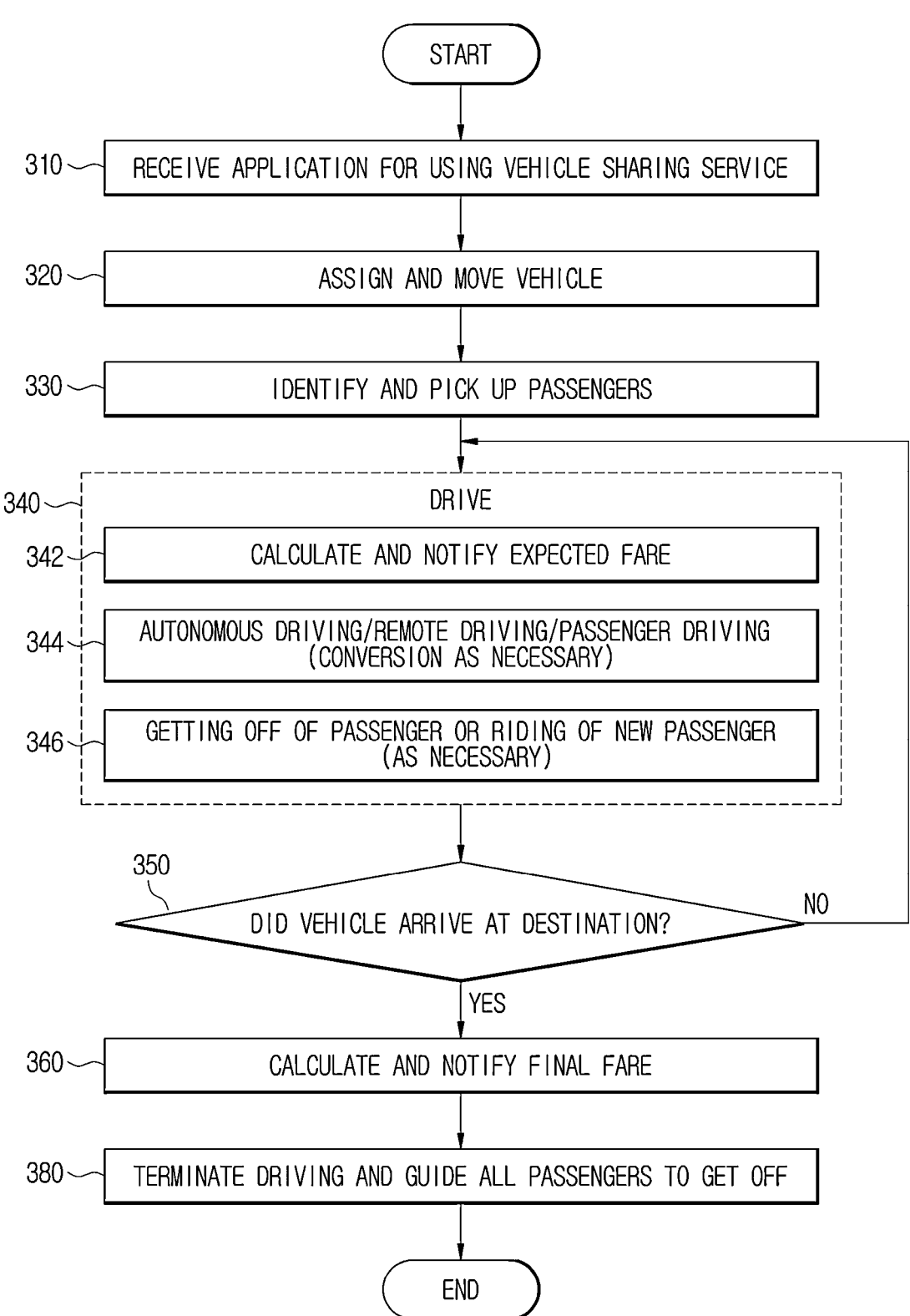
FIG. 3 shows a method of controlling a shared vehicle according to an embodiment of the present disclosure.

FIG. 3 shows a method of controlling a shared vehicle according to an embodiment of the present disclosure. According to the method of controlling the shared vehicle, as shown in FIG. 3, a method is described in view of the shared vehicle 100. The method may assign the shared vehicle 100 to a service applicant, move to a destination, calculate a fare upon arriving at the destination, notify the fare, and then terminate driving.

First, the controller 202 may receive an application for using a vehicle sharing service, from the server 112 of the telematics center 110, in operation 310. The application for using the vehicle sharing service, received by the controller 202, may include vehicle driving-related information. The vehicle driving-related information may include information about the number of passengers, the passengers' facial images, a point of departure, a destination, a stopover, a date of departure, time of departure, etc.

When the shared vehicle 100 matches with a specific applicant's application condition, the shared vehicle 100 may be assigned by the server 112, and the assigned, shared vehicle 100 may move to a point of departure on a date of departure and time of departure designated by the applicant, in operation 320. However, the applicant may himself/herself move to a location of the shared vehicle 100 as necessary. In this case, the location at which the shared vehicle 100 is waiting may be a point of departure.

When the shared vehicle 100 arrives at the point of departure designated by the applicant, passengers may be identified and then ride, in operation 330. Identifying the passengers may be performed by confirming authentication information provided to the applicant's mobile device 120. Alternatively, after the passengers ride in the shared vehicle 100, facial recognition may be performed on the individual passengers by using the indoor camera 212. The recognized facial images may be compared with the individual passengers' facial images provided when the vehicle sharing service is applied. Thus, the individual passengers may be identified. In this process, the number of the passengers may also be checked.

After the riding and identifying of the passengers are completed, the shared vehicle 100 may be driven, in operation 340. While the shared vehicle 100 is driven, i) calculating and notifying an expected fare in operation 342, ii) conversion among autonomous driving/remote driving/passenger driving (as necessary) in operation 344, and iii) getting off of a passenger or riding of a new passenger (as necessary) in operation 346 may be performed repeatedly regardless of the order and number of times.

The calculating and notifying of the expected fare in operation 342 may be performed as follows. When the shared vehicle 100 starts being driven (or before the shared vehicle 100 starts), the controller 202 may calculate an expected fare, which the applicant needs to pay, based on a destination, the number of passengers, a date (time), etc. and may notify the expected fare through the display 222 or the speaker 224. The notified, expected fare may be a fare expected upon starting (or at time of departure) and may be not identical to an actual fare, which passengers are required to pay later.

The calculating of the expected fare is described in more detail with reference to FIG. 4, below.

When the shared vehicle 100 is driven, conversion among autonomous driving/remote driving/passenger driving may be performed as necessary, in operation 344. The shared vehicle 100 may be driven in any one mode of the passenger driving mode, the autonomous driving mode, and the remote driving mode, basically, according to the applicant's (passenger's) setting. However, when it is determined that driving in a current mode is impossible, the controller 202 may convert the current mode to another mode to drive the shared vehicle 100. For reference, it may be to disallow the passenger driving mode when a passenger who will drive the shared vehicle 100 is in a drunken condition or in poor health. Conversion among the driving modes is described in more detail with reference to FIGS. 5 and 6, below.

In the middle of a route from the point of departure to the destination, one of the passengers may get off or a new passenger may ride, in operation 346. Riding or getting off of a passenger in the middle of the route is described in more detail with reference to FIG. 7, below.

When the shared vehicle 100 arrives at the destination ('YES' in operation 350), the controller 202 may calculate a final fare and notify the final fare through the display 222 or the speaker 224, in operation 360. The passengers (users) may check a usage fare, which they need to pay, through the notification of the fare. The final fare may be calculated by applying a fare calculation method, which is described below with reference to FIG. 4. However, the final fare may be calculated by reflecting all various situations that have occurred until the shared vehicle 100 arrives at the destination (place of destination) from the point of departure. For example, all additional items, such as an applied driving mode, the number of passengers, whether getting off has occurred in the middle of the route, whether riding has occurred in the middle of the route, etc., which have never been reflected when the expected fare was calculated, may be applied to calculate the final fare.

For example, fares may be differentially applied according to portions of the passenger driving mode, the autonomous driving mode, and the remote driving mode. An execution time period of the passenger driving mode may be determined to be a time period from activation time to end time of the passenger driving mode. For example, a time period from a time point at which a driver utters a voice command for selecting the passenger driving mode to a time point at which the driver terminates driving may be calculated as an execution time period of the passenger driving mode. Alternatively, an execution time period of the passenger driving mode may be calculated as a time period for which the driver holds the steering wheel. Whether the driver holds the steering wheel may be determined by analyzing an image photographed by the indoor camera 212 or detecting a time period for which the steering wheel is gripped. The time period is detected by the hands off detector 216.

Also, for example, by determining traffic congestion in real time based on a result of analysis on an image photographed by the outdoor camera 100 installed in the shared vehicle 100 and velocity of the shared vehicle 100 at the corresponding time and by comparing the traffic congestion with traffic information provided from the server 112, accurate congestion time may be calculated. For example, when another vehicle located in front of the shared vehicle 100 proceeds at velocity of 20 km/h or lower for 5 minutes or more, a traffic congestion situation may be determined. A reason why the velocity of the other vehicle located in front of the shared vehicle 100, instead of the velocity of the shared vehicle 100, is used as criterion may be that it is difficult to determine whether slow driving has been caused by traffic congestion or intended by the driver of the shared vehicle 100 based on the velocity of the shared vehicle 100. In other words, it may be to determine traffic congestion based on velocity of another vehicle located in front of the shared vehicle 100 for determining an accurate traffic congestion situation. Information about congestion time may be used to calculate a usage fare for the shared vehicle 100 to which a traffic situation is reflected.

When the shared vehicle 100 arrives at the destination and calculation of a final fare is completed, the controller 202 may terminate driving of the shared vehicle 100 and guide all the passengers to get off in a stopped state, in operation 380.

In operation 380, a usage fare may be calculated as follows. However, a method of calculating a usage fare for the shared vehicle 100 according to an embodiment of the present disclosure is not limited to a method which is described below, and another efficient and rational method may be applied.

When the driver selects the autonomous driving mode, a usage fare may be calculated as follows. The usage fare may be a usage fare for the shared vehicle 100, which is finally charged on the driver after the driver arrives at a destination.

$$\text{Usage Fare}=\text{Expected Fare}-\text{Discount}+\text{Extra Charge}$$

Herein, the expected fare may be a fare calculated based on content (a driving mode, a point of departure, a destination, the number of passengers, etc.) input upon an application for use of a service for the shared vehicle 100 under an assumption that there are no special variables. This case may be a case in which the autonomous driving mode (automatic driving mode) is selected as a basic driving mode.

The discount may be calculated as follows.

$$\begin{aligned}\text{Discount}=&\text{Passenger Driving Time}\times\text{Discount Rate}\\&\text{Per Hour}(A)+\text{Number of Passengers}\times\text{Driving}\\&\text{Route}\times\text{Discount Rate Per Hour}(B)\end{aligned}$$

The extra charge may be calculated as follows.

$$\begin{aligned}\text{Extra Charge}=&\text{Calculation Time by Server}\times\text{Extra}\\&\text{Rate Per Hour}(C)+\text{Duration of Remote Driving}\\&\text{Mode}\times\text{Extra Rate Per Hour}(D)\end{aligned}$$

When the driver selects the passenger driving mode, a usage fare may be calculated as follows. Herein, an expected fare may be a fare calculated based on content (a driving mode, a point of departure, a destination, the number of passengers, etc.) input upon an application for use of a service for the shared vehicle 100 under an assumption that there are no special variables. This case may be a case in which the passenger driving mode (manual driving mode) is selected as a basic driving mode. The usage fare may be a usage fare for the shared vehicle 100, which is finally charged on the driver after the driver arrives at a destination.

$$\text{Usage Fare}=\text{Expected Fare}-\text{Discount}+\text{Extra Charge}$$

The discount may be calculated as follows.

The discount may be, when another passenger drives the shared vehicle 100 because an initial driver of the shared vehicle 100 is in a condition having difficulties in driving, provided to the other passenger who drives the shared vehicle 100 instead of the initial driver. The discount may be suggested by the server 112.

The extra charge may be a fare charged additionally when an autonomous driving control or a remote driving control is performed during actual driving although an initial driving mode is the passenger driving mode, wherein the extra charge corresponds to an operation time period of the autonomous driving control or the remote driving control.

$$\begin{aligned}\text{Extra Charge}=&\text{Calculation Time by Server}\times\text{Extra}\\&\text{Rate Per Hour}(C)+\text{Duration of Remote Driving}\\&\text{Mode}\times\text{Extra Rate Per Hour}(D)+\text{Duration of}\\&\text{Autonomous Driving Mode}\times\text{Extra Rate Per}\\&\text{Hour}(E).\end{aligned}$$

Figure 4:
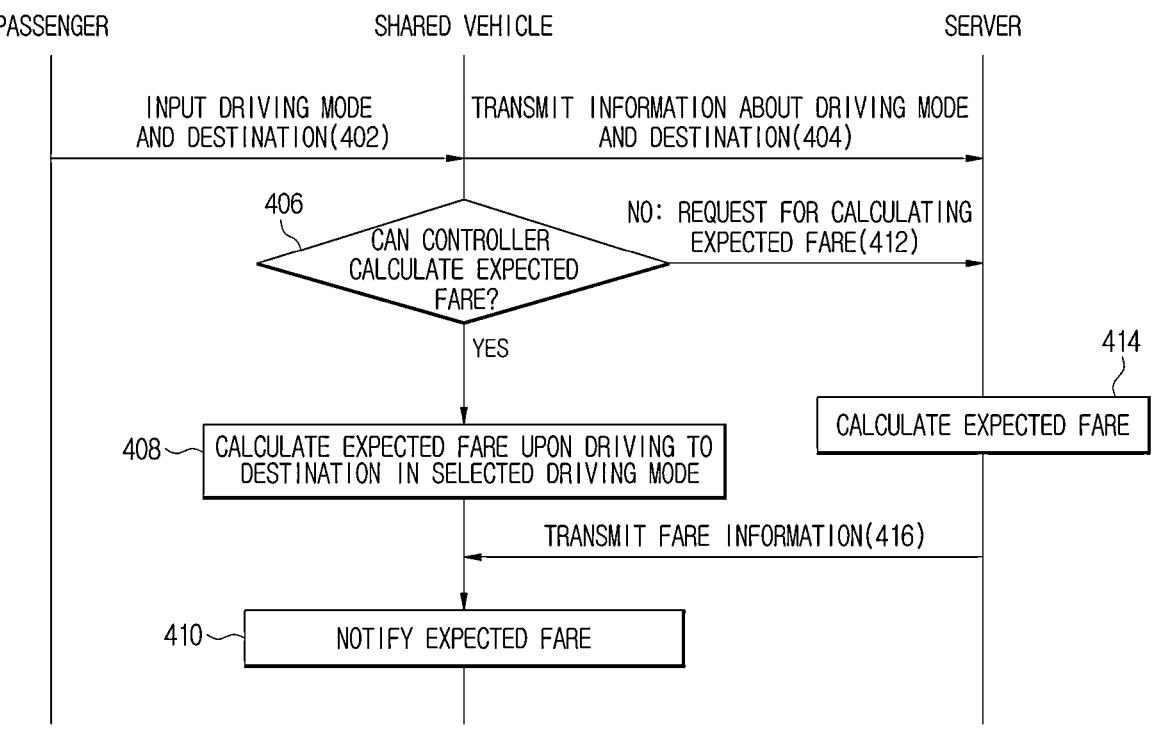
FIG. 4 shows a method of calculating and notifying an expected fare in the method of controlling the shared vehicle as shown in FIG. 3.

FIG. 4 shows a method of calculating and notifying an expected fare in the method of controlling the shared vehicle as shown in FIG. 3.

As shown in FIG. 4, when a passenger rides in the shared vehicle 100, selects a driving mode, and then inputs a destination in operation 402, the controller 202 of the shared vehicle 100 may transmit information about the driving mode and the destination input by the passenger to the server 112 of the telematics center 110, in operation 404. Thus, the controller 202 of the shared vehicle 100 may share the information about the driving mode and the destination with the server 112 of the telematics center 110.

Successively, the controller 202 of the shared vehicle 100 may determine whether it can calculate an expected fare, in operation 406.

When the controller 202 can calculate an expected fare ('YES' in operation 406), the controller 202 of the shared vehicle 100 may calculate an expected fare, in operation 408. When the controller 202 calculates an expected fare, the controller 202 of the shared vehicle 100 may calculate a fare that is expected when the shared vehicle 100 is driven to the destination, based on information about the driving mode, the destination, a date, time, the number of people (the number of passengers), a point of riding, etc., selected by a passenger. However, when a driving mode and a destination input upon an application for use of a service are different from a driving mode and a destination input after riding, an expected fare may be calculated by reflecting the driving mode and destination input after riding.

The expected fare calculated by the controller 202 of the shared vehicle 100 may be notified through the display 222 or the speaker 224 of the shared vehicle 100, in operation 410.

In operation 406, when the controller 202 of the shared vehicle 100 cannot calculate an expected fare ('NO' in operation 406), the controller 202 of the shared vehicle 100 may request the server 112 of the telematics center 110 to calculate an expected fare, in operation 412. There may be a case in which the controller 202 of the shared vehicle 100 being driven in the autonomous driving mode fails to process calculations for situation recognition and determination due to a complicated road structure of a city or a surrounding environment. In this case, the controller 202 may request the server 112 to calculate a usage fare through wireless communication, such as 5Generation (5G), Long Term Evolution (LTE), WAVE, etc. When the server 112 receives a request for calculating an expected fare from the controller 202 of the shared vehicle 100, the server 112 may calculate an expected fare and transmit information about the calculated, expected fare to the controller 202 of the shared vehicle 100, in operation 416. When the server 112 of the telematics center 110 calculates the expected fare, the server 112 of the telematics center 110 may calculate a fare that is expected when the shared vehicle 100 is driven to the destination, based on information about a driving mode, a destination, a date, time, the number of people (the number of passengers), a point of riding, etc., selected by a passenger. However, when the driving mode and destination input upon the application for use of the service are different from the driving mode and destination input after riding, an expected fare may be calculated by reflecting the driving mode and destination input after riding.

The expected fare calculated by the server 112 of the telematics center 110 may be notified through the display 222 or the speaker 224 of the shared vehicle 100, in operation 410.

Figure 5:
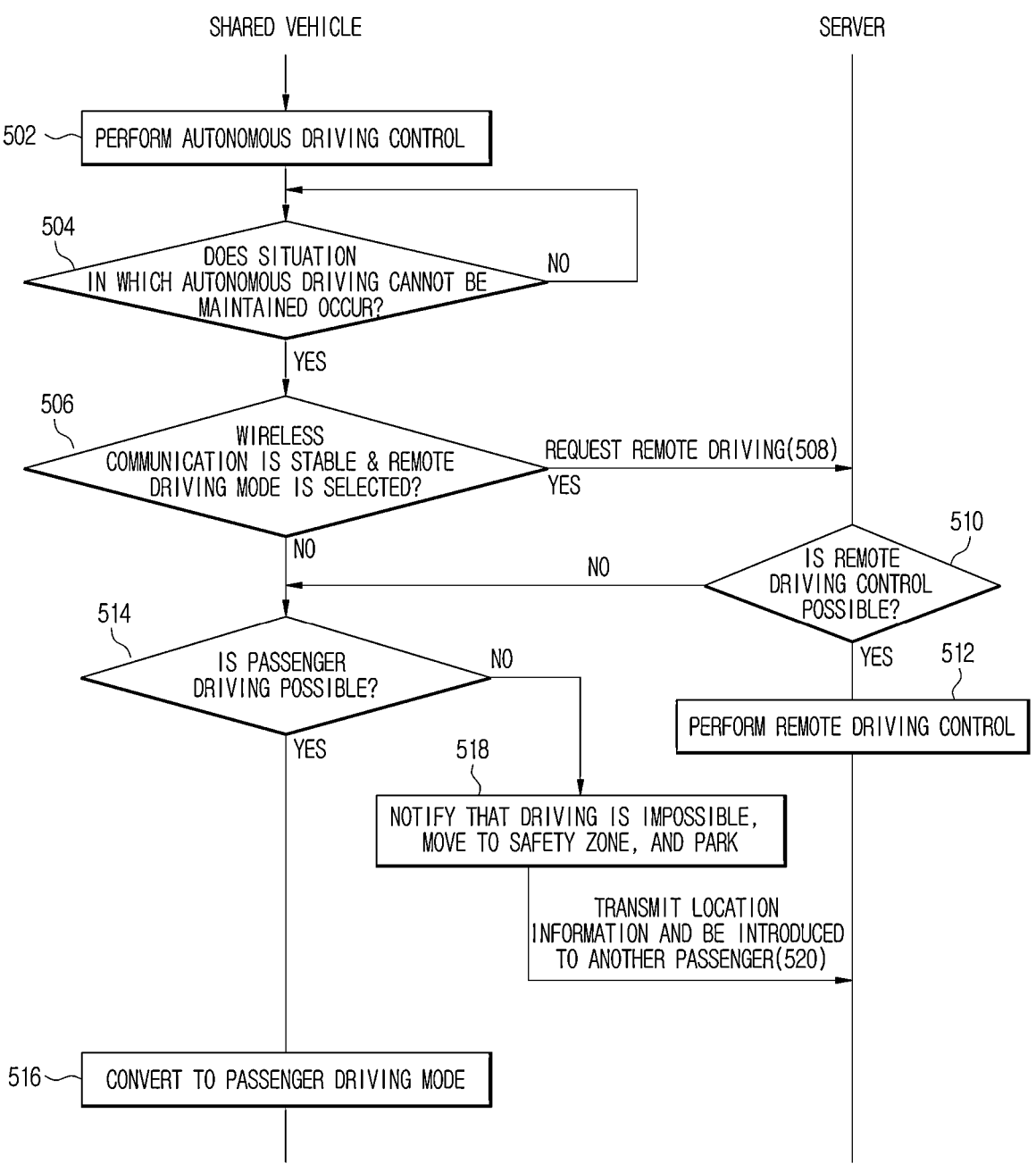
FIG. 5 shows a control method for conversion from an autonomous driving mode to a remote driving mode or a passenger driving mode in the method of controlling the shared vehicle as shown in FIG. 3.

FIG. 5 shows a control method for conversion from the autonomous driving mode to the remote driving mode or the passenger driving mode in the method of controlling the shared vehicle as shown in FIG. 3.

As shown in FIG. 5, when a driver selects the autonomous driving mode, autonomous driving of the shared vehicle 100 may be performed by an autonomous driving control by the controller 202, in operation 502. While the autonomous driving of the shared vehicle 100 is performed, the controller 202 may continue to check whether the autonomous driving mode of the shared vehicle 100 can be continuously maintained or whether a situation in which the autonomous driving mode cannot be maintained occurs. The situation in which the autonomous driving mode of the shared vehicle 100 cannot be maintained may be, for example, a situation in which there are difficulties in obtaining information about a surrounding environment of the shared vehicle 100.

When a situation in which the autonomous driving mode of the shared vehicle 100 cannot be maintained occurs ('YES' in operation 504), the controller 202 may check whether the driver selects the remote driving mode in a state of a stable wireless communication between the shared vehicle 100 and the server 112, in operation 506.

When the wireless communication between the shared vehicle 100 and the server 112 is stable and the driver selects the remote driving mode ('YES' in operation 506), the controller 202 may request the server 112 to perform a remote driving control, in operation 508.

When a remote driving control for the shared vehicle 100 is possible ('YES' in operation 510), the server 202 may perform a remote driving control for the shared vehicle 100, in operation 512.

When the wireless communication between the shared vehicle 100 and the server 112 is unstable ('NO' in operation 506), when the driver does not select the remote driving mode ('NO' in operation 506), or when a remote driving control for the shared vehicle 100 is impossible in operation 510 ('NO' in operation 510), the controller 202 may determine whether the passenger driving is possible, in operation 514. A case in which a remote driving control is impossible may be a case in which communication between the shared vehicle 100 and the server 112 is unstable.

When the passenger driving is possible ('YES' in operation 514), the controller 202 may convert a driving mode of the shared vehicle 100 from the autonomous driving mode to the passenger driving mode and may guide a passenger to drive the shared vehicle 100, in operation 516.

When passenger driving is impossible ('NO' in operation 514), this means that all of the autonomous driving mode, the remote driving mode, and the passenger driving mode are impossible. Therefore, the controller 202 may notify that driving is impossible through the display 222 or the speaker 224, move the shared vehicle 100 to a safety zone located closest to the shared vehicle 100, and then perform emergency parking, in operation 518.

Thereafter, the controller 202 may transmit a location of the shared vehicle 100 emergency-parked to the server 112 and may be introduced to another user that can use the shared vehicle 100 from the server 112, in operation 520.

Figure 6:
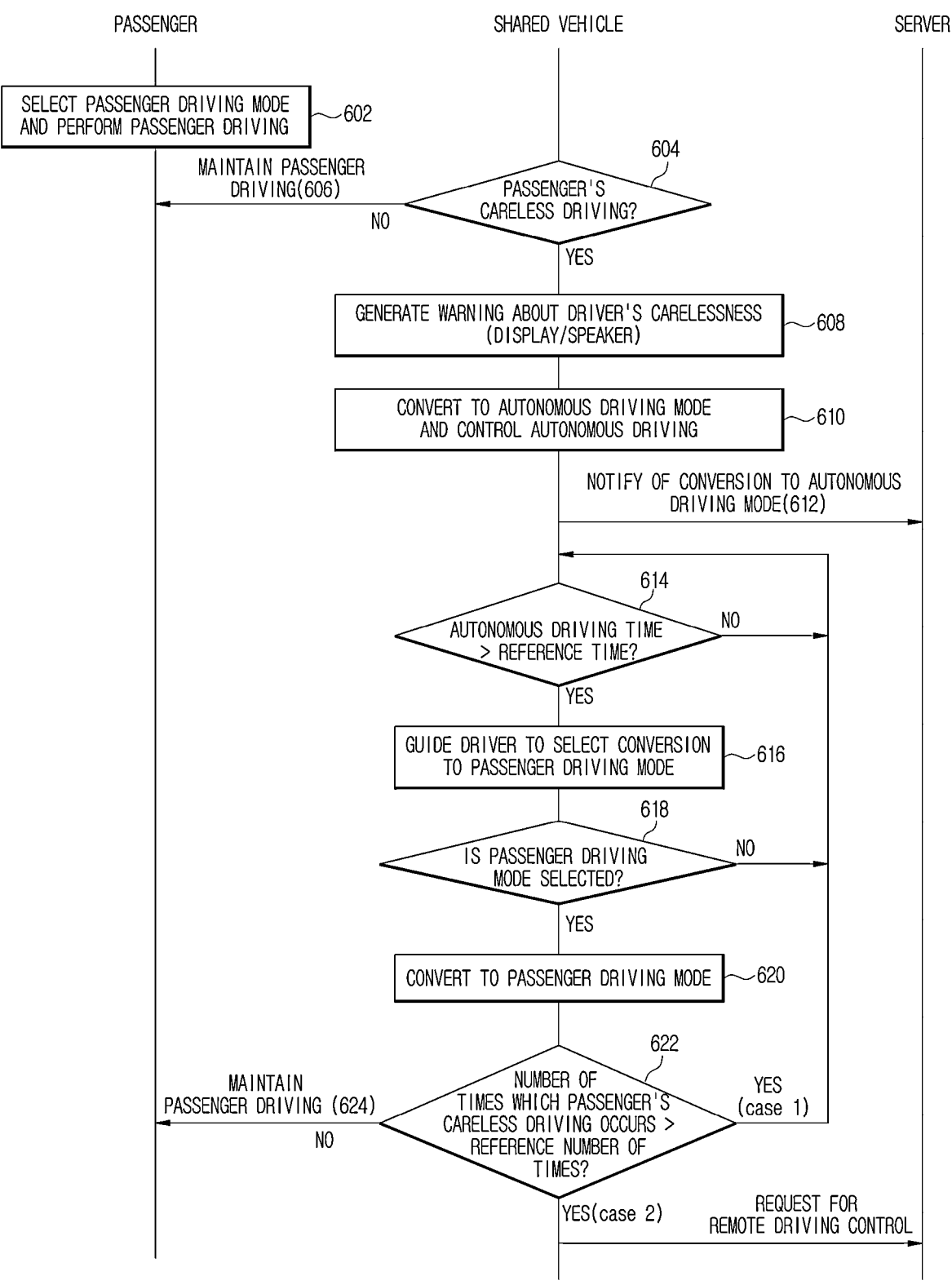
FIG. 6 shows a control method for conversion from the passenger driving mode to the autonomous driving mode or the remote driving mode in the method of controlling the shared vehicle as shown in FIG. 3.

FIG. 6 shows a control method for conversion from the passenger driving mode to the autonomous driving mode or the remote driving mode in the method of controlling the shared vehicle as shown in FIG. 3.

As shown in FIG. 6, when a driver selects the passenger driving mode, passenger driving for enabling a passenger (driver) to drive the shared vehicle 100 by himself/herself may be performed, in operation 602.

When the driver does not have any careless behavior in the passenger driving mode ('NO' in operation 604), the controller 202 may maintain the passenger driving mode, in operation 606.

In contrast, when the controller 202 determines that there are difficulties in safe driving of the shared vehicle 100 due to a passenger's (driver's) careless behavior while the passenger (driver), by himself/herself, drives the shared vehicle 100 ('YES' in operation 604), the controller 202 may generate a warning for the driver's carelessness through the display 222 or the speaker 224 in operation 608, convert the driving mode of the shared vehicle 100 from the passenger driving mode to the autonomous driving mode for securing driving safety in operation 610, and perform an autonomous driving control for the shared vehicle 100 in operation 610. In this case, the controller 202 may notify the server 112 that the driving mode of the shared vehicle 100 has been converted from the passenger driving mode to the autonomous driving mode, in operation 612.

When a time period for which autonomous driving is performed after conversion from the passenger driving mode to the autonomous driving mode due to the driver's careless behavior exceeds a preset reference time period ('YES' in operation 614), the controller 202 may guide the driver to select conversion to the passenger driving mode, in operation 616. At this time, the controller 202 may display a selection menu on the display 222 and receive a selection by the driver.

When the driver selects the passenger driving mode ('YES' in operation 618), the controller 202 may convert the driving mode of the shared vehicle 100 from the autonomous driving mode to the passenger driving mode, and enable the driver to drive the shared vehicle 100 by himself/herself, in operation 620. When the driver does not select the passenger driving mode ('NO' in operation 618), the controller 202 may continue to maintain the autonomous driving mode of the shared vehicle 100.

When the passenger's (driver's) careless behavior is repeated after conversion to the passenger driving mode, the controller 202 may count the number of times which the driver's careless behavior occurs, in operation 622.

When the cumulative number of times which the driver's careless behavior has occurred does not exceed a preset reference number of times ('NO' in operation 622), the controller 202 may continue to maintain the passenger driving mode, in operation 624.

In contrast, when the cumulative number of times which the driver's careless behavior has occurred exceeds the preset reference number of times ('YES' in operation 622), the controller 202 may continue to maintain the autonomous driving mode ('case 1' in operation 622) or request the server 112 to perform a remote driving control ('case 2' in operation 622).

The passenger's (driver's) careless behavior may be, for example, a case in which the passenger (driver) takes his/her hand off the steering wheel for a long time or too often during driving. Also, the passenger's (driver's) careless behavior may be, for example, a case in which the passenger (driver) controls portable devices such as the mobile device 120 during driving. Also, the passenger's (driver's) careless behavior may be, for example, a case in which the passenger's (driver's) drowsy driving is detected.

Figure 7:
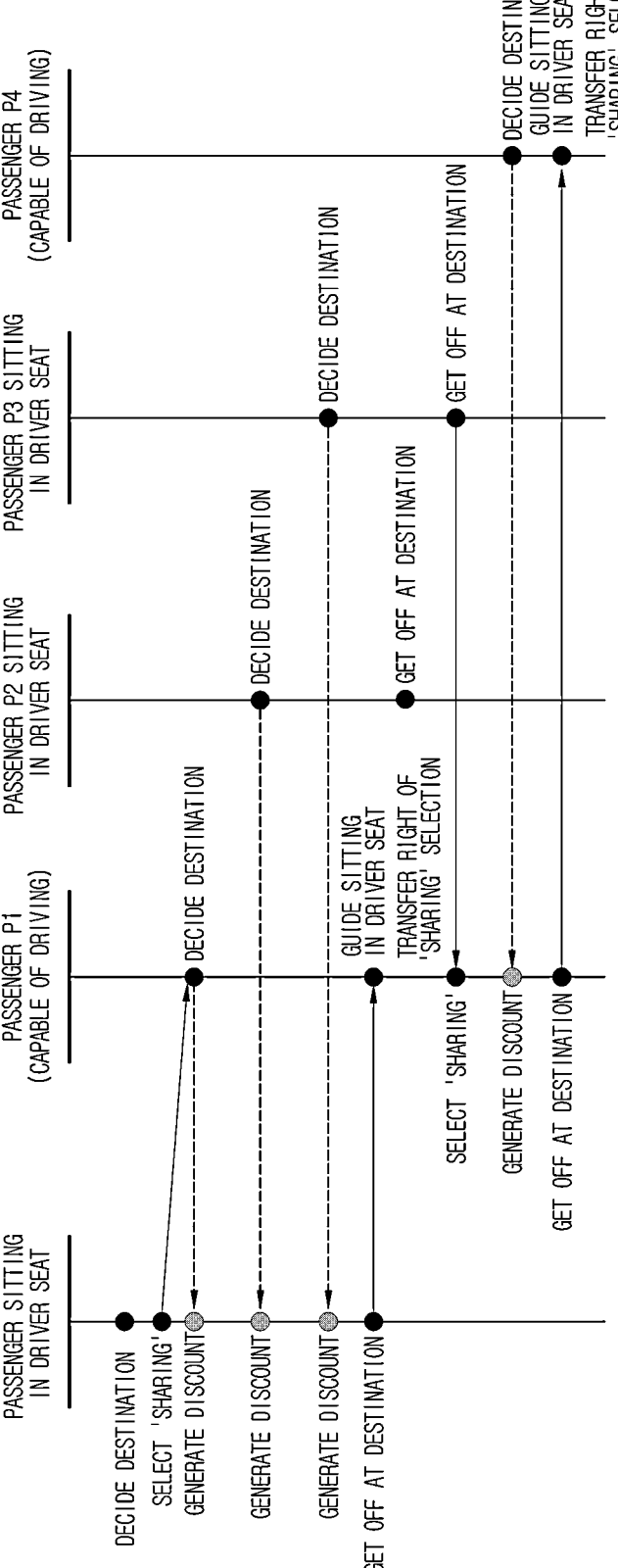
FIG. 7 shows changes of rights and fares according to passengers' getting off in the method of controlling the shared vehicle as shown in FIG. 3.

FIG. 7 shows changes of rights and fares according to passengers' getting off in the method of controlling the shared vehicle 100 as shown in FIG. 3. In the method of FIG. 7, it is assumed that a passenger sitting in a driver seat and four additional passengers (fellow passengers) P1 to P4 ride together.

As shown in FIG. 7, when the passenger sitting in the driver seat decides his/her destination and then selects 'sharing', riding of additional passengers (fellow passengers) may be allowed. Destinations of the additional passengers may be the same as or different from the destination of the passenger sitting in the driver seat.

After the passenger sitting in the driver seat selects 'sharing', the passenger P1 may share the shared vehicle 100 and decide a destination. In this case, a fare discount for the passenger sitting in the driver seat may be generated according to the sharing of the passenger P1. When another passenger P2 shares the shared vehicle 100 and decides a destination, an additional fare discount for the passenger sitting in the driver seat may be generated according to the sharing of the passenger P2. In other words, a fare discount amount for the passenger sitting in the driver seat may increase by the number of additional passengers (fellow passengers). A fare discount by riding of the passengers P1 and P2 may be applied to the passenger sitting in the driver seat.

The passenger P1 among the four fellow passengers may have riding authority for the driver seat. When the passenger P1 has riding authority for the driver seat, the passenger currently sitting in the driver seat may first arrive at his/her destination and get off the shared vehicle 100. In this case, the controller 202 may guide the passenger P1 to sit in the driver seat. The controller 202 may then transfer a right of a 'sharing' selection that the passenger previously sitting in the driver seat and getting off has had to the passenger P1, who newly or now sits or will next sit in the driver seat.

When the passenger P1 sits in the driver seat, receives the right of the 'sharing' selection, and then selects 'sharing', riding of any additional passenger (fellow passenger) may be allowed. In this state, when the passenger P3 shares the shared vehicle 100 and decides a destination, an additional fare discount for the passenger P1 sitting in the driver seat may be generated according to the sharing of the passenger P3. Also, when another passenger P4 shares the shared vehicle 100 and decides a destination, an additional fare discount for the passenger P1 sitting in the driver seat may be generated according to the sharing of the passenger P4. In other words, a fare discount amount of a passenger sitting in the driver seat may increase by the number of additional passengers (fellow passengers). At this time, a fare discount by riding of the passengers P3 and P4 may be applied to the passenger (in other words, the passenger P1) currently sitting in the driver seat.

Similar to when an initial passenger sitting in the driver seat first gets off, the passenger P1 sits in the driver seat and then selects 'sharing', as described above. When the passenger P1 secondly sitting in the driver seat, first among the remaining passengers in the shared vehicle 100, arrives at the destination and gets off, the controller 202 may guide the passenger P4 to have a right of riding for the driving seat among the remaining passengers to sit in the driver seat. The controller 202 may transfer a right of a 'sharing' selection that the passenger (i.e., the passenger P1) previously sitting in the driver seat and getting off has had to the passenger P4, who newly or now sits or will next sit in the driver seat.

In other words, when a passenger sitting in the driver seat and having a right (driving right) of riding for a driver seat and a right of a 'sharing' selection gets off, the right (driving right) of riding for the driver seat and the right of the 'sharing' selection may be automatically transferred to another passenger having a right (driving right) of riding for a driver seat and a right of a 'sharing' selection. The right (driving right) of riding for the driver seat and the right of the 'sharing' selection may be decided upon an application for a service of the shared vehicle 100 or may be decided through a user interface displayed on the display 222 after a passenger rides in the shared vehicle 100.

A reason why a right of riding for a driver seat is assigned to a specific passenger may be that this may enable a passenger sitting in the driver seat to deal with an emergency situation or an unexpected situation. As such, because a passenger sitting in the driver seat can deal with an emergency situation and perform the passenger driving mode as necessary, it may be to provide the passenger sitting in the driver seat with a fare discount according to riding of an additional passenger (fellow passenger). When all additional passengers do not select 'capable of driving', it will be impossible to quickly deal with an emergency situation or an unexpected situation. Accordingly, when an additional passenger (fellow passenger) having a more distant destination than that of an initial passenger sitting in the driver seat applies for use of the shared vehicle 100, it may be desirable to check whether the additional passenger can drive and then allow sharing only when the additional passenger can drive.

Figure 8:
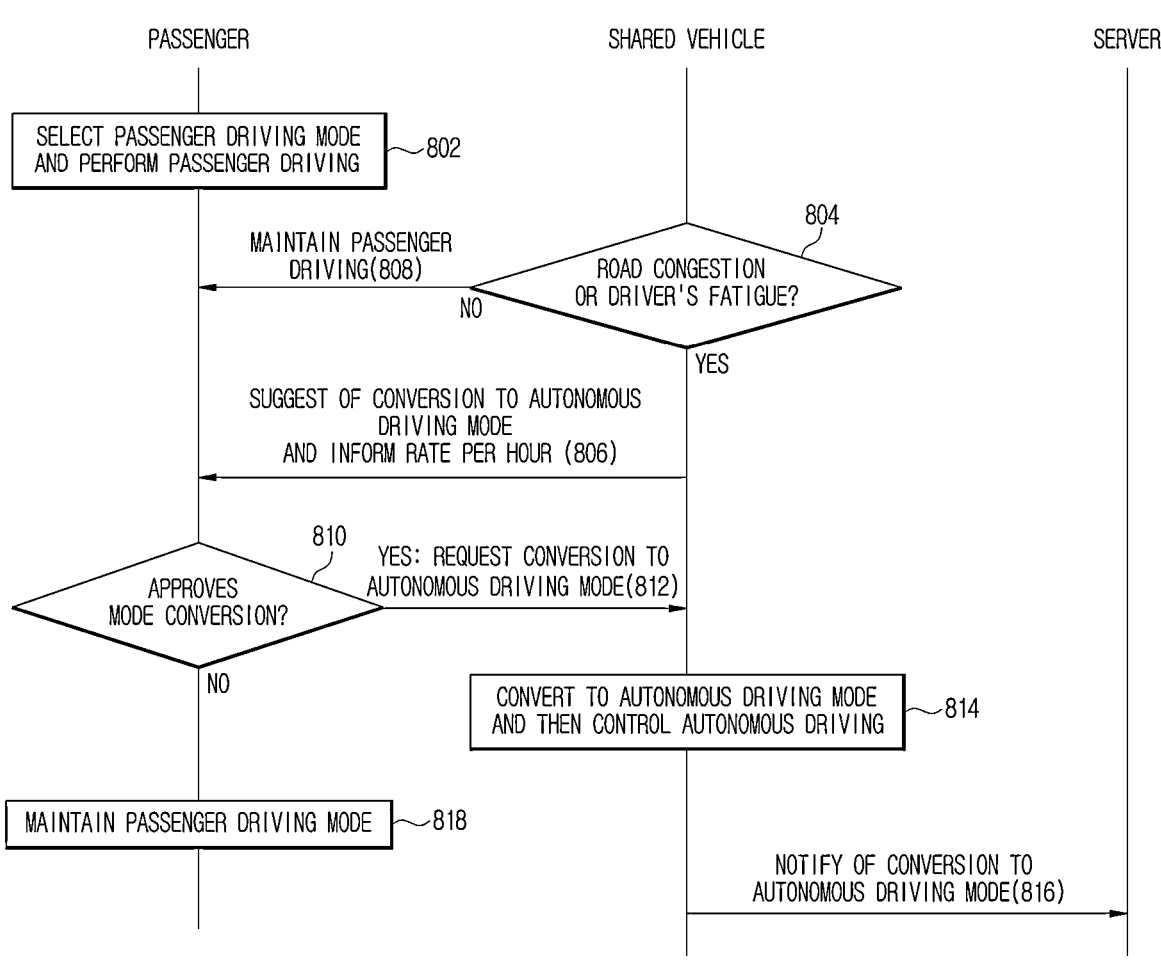
FIG. 8 shows another control method for conversion from the passenger driving mode to the autonomous driving mode or the remote driving mode in the method of controlling the shared vehicle as shown in FIG. 3.

FIG. 8 shows another control method for conversion from the passenger driving mode to the autonomous driving mode or the remote driving mode in the method of controlling the shared vehicle 100 as shown in FIG. 3.

As shown in FIG. 8, passenger driving in which a passenger (driver), by himself/herself, drives the shared vehicle 100 may be performed according to a selection of the passenger driving mode by the driver, in operation 802.

In the passenger driving mode, when a road on which the driver drives the shared vehicle 100 is too congested, or when the driver's fatigue is too high ('YES' in operation 804), the shared vehicle 100 may suggest the passenger of conversion to the autonomous driving mode and may inform a rate per hour, which is expected to be generated upon conversion to the autonomous driving mode, in operation 806.

When the road is not congested, or when the driver's fatigue is not high, i.e., when congestion of the road or the driver's fatigue does not exceed a preset reference value, the shared vehicle 100 may maintain the passenger driving mode ('NO' in operation 808).

Congestion of the road on which the driver drives the shared vehicle 100 may be determined by analyzing images about surroundings of the shared vehicle 100, photographed by the outdoor camera 214, or determined based on traffic information provided from the server 112. The driver's fatigue may be determined from the driver's driving time until now, etc.

Also, in this case, when autonomous driving is performed, autonomous driving information may be extended according to congestion of a road. For example, when a road is highly congested so that conversion to the autonomous driving mode occurs, additional autonomous driving information may be received from the server 112, in addition to that obtained from information detection means (for example, the outdoor camera 214, RADAR (not shown), LiDAR (not shown), etc.) of the shared vehicle 100, for autonomous driving. The additional autonomous driving information may be used for autonomous driving of the shared vehicle 100. As such, when the additional autonomous driving information provided from the server 112 is used, a rate per hour may further increase, and the shared vehicle 100 may notify a passenger (driver) of the increase of the rate per hour such that the passenger decides conversion to the autonomous driving mode by considering the increase of the rate per hour.

When the passenger (driver) approves mode conversion in response to a suggestion for conversion to the autonomous driving mode from the shared vehicle 100 ('YES' in operation 810), the passenger may request conversion to the autonomous driving mode in operation 812 and the shared vehicle 100 may convert the driving mode from the passenger driving mode to the autonomous driving mode and then perform a control for autonomous driving, in operation 814. Also, the shared vehicle 100 may notify the server 112 that the driving mode has been converted from the passenger driving mode to the autonomous driving mode, in operation 816.

When the passenger (driver) does not approve mode conversion in response to the suggestion for conversion to the autonomous driving mode from the shared vehicle 100 ('NO' in operation 810), the shared vehicle 100 may maintain the passenger driving mode in operation 818.

An aspect of the present disclosure is aimed to provide a vehicle sharing service capable of efficiently and reasonably calculating a usage fare for a shared vehicle in various ways.

The above descriptions are only examples of the technical spirit, so a person having ordinary skill in the art may implement various corrections, modifications, and substitutions without departing from the intrinsic characteristics. Thus, the embodiments and drawings disclosed herein are intended not to limit but to describe the technical spirit. The scope of the technical sprit is not limited to the embodiments and drawings. The protective scope is defined by the appended claims, and all technical spirits within the equivalent scope are construed as being included in the scope of the right.

What is claimed is:

1. A method of controlling a shared vehicle, the method comprising:
   driving the shared vehicle in at least one driving mode of a manual driving mode in which a driver drives the shared vehicle or an automatic driving mode in which the shared vehicle is driven by an autonomous driving control of the shared vehicle or by a remote control of a control subject without a driver's intervention;
   converting the manual driving mode to the automatic driving mode when a predefined careless behavior occurs during the driver's manual driving;
   determining traffic congestion in real time based on a result analysis on an image photographed by an outdoor camera installed in the shared vehicle and a velocity of the shared vehicle at the corresponding time;
   calculating congestion time by comparing the traffic congestion with traffic information provided from a server;
   calculating a usage fare by a predefined calculation method based on the determined congestion time, an operation time period of the manual driving mode, and an operation time period of the automatic driving mode;
   when the shared vehicle arrives at a destination and calculation of the usage fare is completed, terminating driving of the shared vehicle;
   guiding the driver to select a conversion to the manual driving mode by displaying a selection menu on a display when a time period for which the automatic driving mode is performed after a conversion from the manual driving mode to the automatic driving mode due to the driver's careless behavior exceeds a preset reference time period;
   converting the driving mode of the shared vehicle from the automatic driving mode to the manual driving mode when the driver selects the manual driving mode by selecting the selection menu on the display; and
   maintaining the automatic driving mode when the cumulative number of times which the driver's careless behavior has occurred exceeds a preset reference number of times.

2. The method of claim 1, wherein the usage fare for the shared vehicle is calculated by reflecting a discount and an extra charge generated during driving to an expected fare calculated in advance.

3. The method of claim 2, wherein, when the driver selects the automatic driving mode as a basic driving mode, the discount is calculated further based on at least one of a discount rate A per hour according to a passenger driving time period, the number of fellow passengers, or a discount rate per hour according to a driving route.

4. The method of claim 2, wherein, when the driver selects the automatic driving mode as a basic driving mode, the extra charge is calculated based on at least one of an additional rate C per hour according to calculation time by a server or an additional rate D per hour according to an execution time period of a remote driving mode, and
   wherein the server is the control subject of controlling the shared vehicle at a remote region to perform remote driving, and the execution time period of the remote driving mode is a time period for which remote driving of the shared vehicle is performed by a control by the server.

5. The method of claim 2, wherein, when the driver selects the manual driving mode as a basic driving mode, and an additional passenger drives the shared vehicle in a state in which an initial driver of the shared vehicle is incapable of driving, the discount is provided to the additional passenger.

6. The method of claim 2, wherein, when the driver selects the manual driving mode as a basic driving mode, the extra charge is calculated based on at least one of an additional rate C per hour according to calculation time by a server, an additional rate D per hour according to an execution time period of a remote driving mode, or an additional rate E per hour according to an execution time period of autonomous driving.

7. The method of claim 2, wherein, when one or more additional passengers except for the driver exist, the discount is generated by the number of the additional passengers.

8. The method of claim 1, wherein the usage fare for the shared vehicle is calculated by further reflecting at least one of the number of passengers of the shared vehicle, a point of departure, the destination, a date, or time.

9. The method of claim 1, wherein the operation time period of the manual driving mode is determined to be a time period from activation time to end time of the manual driving mode.

10. The method of claim 1, wherein the automatic driving mode comprises:

an autonomous driving mode in which the control subject of the shared vehicle controls the shared vehicle to drive the shared vehicle; and a remote driving mode in which a control subject located at a remote region that is distant from the shared vehicle controls the shared vehicle to drive the shared vehicle.

11. The method of claim 10, wherein the driving mode is converted between the manual driving mode, the autonomous driving mode, and the remote driving mode according to the driver's condition during driving of the shared vehicle.

12. A shared vehicle comprising:

a device configured to obtain information about a surrounding environment of the shared vehicle;

a communicator configured to communicate with a control subject located at a remote region; and a controller configured to:

perform a control for driving the shared vehicle in at least one driving mode of a manual driving mode in which a driver drives the shared vehicle or an automatic driving mode in which the shared vehicle is driven by an autonomous driving control of the shared vehicle or by a remote control of the control subject without a driver's intervention;

convert the manual driving mode to the automatic driving mode when a predefined careless behavior occurs during the driver's manual driving;

determine traffic congestion in real time based on a result analysis on an image photographed by an outdoor camera installed in the shared vehicle and a velocity of the shared vehicle at the corresponding time;

calculate congestion time by comparing the traffic congestion with traffic information provided from a server;

calculate a usage fare by a predefined calculation method based on the determined congestion time, an operation time period of the manual driving mode, and an operation time period of the automatic driving mode;

when the shared vehicle arrives at a destination and calculation of the usage fare is completed, terminate driving of the shared vehicle;

guide the driver to select a conversion to the manual driving mode by displaying a selection menu on a display when a time period for which the automatic driving mode is performed after a conversion from the manual driving mode to the automatic driving mode due to the driver's careless behavior exceeds a preset reference time period;

convert the driving mode of the shared vehicle from the automatic driving mode to the manual driving mode when the driver selects the manual driving mode by selecting the selection menu on the display; and maintain the automatic driving mode when the cumulative number of times which the driver's careless behavior has occurred exceeds a preset reference number of times.

13. The shared vehicle of claim 12, wherein the usage fare for the shared vehicle is calculated by reflecting a discount and an extra charge generated during driving to an expected fare calculated in advance.

14. The shared vehicle of claim 13, wherein, when the driver selects the automatic driving mode as a basic driving mode, the discount is calculated further based on at least one of a discount rate A per hour according to a passenger driving time period, the number of fellow passengers, or a discount rate per hour according to a driving route.

15. The shared vehicle of claim 13, wherein, when the driver selects the automatic driving mode as a basic driving mode, the extra charge is calculated based on at least one of an additional rate C per hour according to calculation time by a server or an additional rate D per hour according to an execution time period of a remote driving mode, and wherein the server is the control subject of controlling the shared vehicle at a remote region to perform remote driving, and the execution time period of the remote driving mode is a time period for which remote driving of the shared vehicle is performed by a control by the server.

16. The shared vehicle of claim 13, wherein, when the driver selects the manual driving mode as a basic driving mode, and an additional passenger drives the shared vehicle in a state in which an initial driver of the shared vehicle is incapable of driving, the discount is provided to the additional passenger.

17. The shared vehicle of claim 13, wherein, when the driver selects the manual driving mode as a basic driving mode, the extra charge is calculated based on at least one of an additional rate C per hour according to calculation time by a server, an additional rate D per hour according to an execution time period of a remote driving mode, or an additional rate E per hour according to an execution time period of autonomous driving.

18. The shared vehicle of claim 13, wherein, when one or more additional passengers except for the driver exist, the discount is generated by the number of the additional passengers.

19. The shared vehicle of claim 12, wherein the usage fare for the shared vehicle is calculated by further reflecting at least one of the number of passengers of the shared vehicle, a point of departure, the destination, a date, or time.

20. The shared vehicle of claim 12, wherein the operation time period of the manual driving mode is determined to be a time period from activation time to end time of the manual driving mode.

21. The shared vehicle of claim 12, wherein the automatic driving mode comprises:

an autonomous driving mode in which the control subject of the shared vehicle controls the shared vehicle to drive the shared vehicle; and a remote driving mode in which the control subject located at a remote region that is distant from the shared vehicle controls the shared vehicle to drive the shared vehicle.

22. The shared vehicle of claim 21, wherein the driving mode is converted between the manual driving mode, the autonomous driving mode, and the remote driving mode according to the driver's condition during driving of the shared vehicle.

* * * * *